United States Patent [19]

Wu et al.

[11] Patent Number: 5,376,441
[45] Date of Patent: Dec. 27, 1994

[54] MICROEMULSION POLYMERIZATION SYSTEMS AND COATED MATERIALS MADE THEREFROM

[75] Inventors: Huey Shen Wu; Eric W. Kaler, both of Newark, Del.

[73] Assignee: W. L. Gore & associates, Inc., Newark, Del.

[21] Appl. No.: 220,133

[22] Filed: Mar. 30, 1994

Related U.S. Application Data

[62] Division of Ser. No. 38,573, Mar. 26, 1993.

[51] Int. Cl.$^5$ ................................. B32B 3/26
[52] U.S. Cl. ........................... 428/304.4; 428/339
[58] Field of Search ...................... 428/304.4, 339

[56] References Cited

U.S. PATENT DOCUMENTS

| | | |
|---|---|---|
| 4,566,981 | 1/1986 | Howells . |
| 4,668,726 | 5/1987 | Howells . |
| 4,722,904 | 9/1989 | Feil . |
| 4,864,006 | 9/1989 | Giannetti et al. . |
| 4,975,468 | 12/1990 | Yiv . |
| 4,985,282 | 1/1991 | Moggi et al. . |
| 5,077,097 | 12/1991 | Moggi et al. . |
| 5,151,217 | 9/1992 | Price . |
| 5,234,807 | 8/1993 | Texter . |

FOREIGN PATENT DOCUMENTS

| | | |
|---|---|---|
| 182516 | 5/1986 | European Pat. Off. . |
| 0193960 | 9/1986 | European Pat. Off. . |
| 0280312 | 8/1988 | European Pat. Off. . |
| 0315078 | 5/1989 | European Pat. Off. . |
| 0315841 | 5/1989 | European Pat. Off. . |
| 2515198 | 10/1981 | France . |
| 03109410 | 5/1991 | Japan . |
| 6510472 | 2/1966 | Netherlands . |
| 1237673 | 5/1984 | U.S.S.R. . |

OTHER PUBLICATIONS

Macromolecules, Polym. of Tetrahydrofurfuryl Methacrylate in Three-Component Anionic Microemulsions, Full, et al, 1992.
Chemical Abstracts, vol. 115, No. 22, 2 Dec. 1991, Columbis, Ohio Abstract No. 233147, "Acrylic Resin Aqueous Emulsions with good Dispersion Stability" and abstract of JP A, 03 109 410 (Nitto Denko Corp). 9 May 1991.

*Primary Examiner*—Joseph L. Schofer
*Assistant Examiner*—N. Sarofim
*Attorney, Agent, or Firm*—Gary A. Samuels

[57] ABSTRACT

Aqueous microemulsions are described which are polymerized to produce a latex containing particles of organic polymer having recurring pendant perfluorinated organic side chains which have an average particle size of between 0.01 and 0.5 micrometers. The latex can be used to coat the surface of substrate structures, or to coat the pore walls of porous substrate structures.

9 Claims, No Drawings

MICROEMULSION POLYMERIZATION SYSTEMS AND COATED MATERIALS MADE THEREFROM

This application is a division of application No. 08/038,573, filed Mar. 26, 1993.

FIELD OF THE INVENTION

This invention relates to microemulsions of fluorine-containing monomers and to the production of submicron latex particles made from the microemulsions and to coated materials made from them.

BACKGROUND OF THE INVENTION

Microemulsions are known in the art. They are stable isotropic mixtures of oil, water, and surfactant. Other components, such as salt or a co-surfactant (an alcohol, amine, or other amphiphilic molecule) may also be part of the microemulsion formulation. The oil and water reside in distinct domains separated by an interfacial layer rich in surfactant. Because the domains of oil or water are small, microemulsions appear visually transparent or translucent, and are not birefringent. Unlike emulsions, microemulsions are equilibrium phases and form spontaneously upon contact of the ingredients.

Microemulsions can have a variety of microstructures, depending mainly on composition and temperature. The common structural feature is the presence of a surfactant-rich sheet separating oil-rich and water-rich domains. There are three most common structures. One is the so-called water-in-oil microemulsions, in which water is contained inside distinct domains (droplets) in a continuous oil-rich domain. A second is oil-in-water microemulsions in which oil is contained inside distinct domains in a continuous water-rich domain. The third is bicontinuous microemulsions in which there are sample-spanning intertwined paths of both oil and water, separated from each other by the surfactant-rich film (a sponge-like structure).

In contrast to bulk and solution polymerization, high reaction rates, high conversions and large molecular weights are achieved using either emulsion or microemulsion polymerization of unsaturated hydrocarbons, which are considered to be oils. In both cases the high rates and conversions and large molecular weights are thought to be obtained because the monomer molecules are concentrated in a number of small regions or domains of the microemulsion, which facilitates reaction among themselves. Microemulsion polymerization has several advantages over traditional emulsion polymerization. First, emulsions are turbid and opaque, while microemulsions are usually transparent or translucent and so are particularly suitable for photochemical reactions. Second, microemulsion polymerization enables preparation of stable, monodisperse microlatexes containing particles smaller than those produced with classical emulsion polymerization processes. Finally, the structural diversity of microemulsions (droplet and bicontinuous) is set by thermodynamics, and rapid polymerization may be able to capture some of the original structure.

Modification of porous substrates by coating them with fluorinated polymers is known in the literature, thus, porous substrates can be coated with water-repellant polymers in order to increase their hydrophobicity. However, such processes normally require expensive and/or environmental-hazardous fluorinated solvents, such as CFCs. Moreover, water-based emulsion polymerization of fluorinated monomers usually yields particles with sizes in the range of 0.1–10 micron, which makes it difficult to give uniform coatings on substrates having submicron pore structures. In addition, such large particles sizes result in coatings that can clog the pores of submicron pore structures, which is detrimental in many applications.

It would be desirable, therefore, to provide new microemulsions involving fluorinated monomers, and polymers of very small particle sizes made from the monomer microemulsions. It would also be desirable to provide coated substrates in which the coatings are made from the small polymer particles.

SUMMARY OF THE INVENTION

In this invention an aqueous microemulsion polymerization system is provided in which latex particles are produced containing organic polymer having recurring pendant fluorinated organic side chains and in which the particles have an average diameter between 0.01 and 0.5 micrometer, preferably 0.01 to 0.1 micrometer.

The resulting latex can be used to coat a variety of substrates. For example, with such small particles, the interiors of porous articles can be coated without significant diminuation of pore volume. Thus the products of microemulsions can be used to coat the pore walls, i.e., to coat the encompassing structure that defines the pores. The porous articles include knit fabrics, nonwoven fabrics or sheets, or polymeric materials including materials having pores from one side to the other, such as porous polytetrafluoroethylene, porous polyethylene, porous polypropylene, and in particular microporous structures of them.

By "porous" is meant that openings are provided that communicate from one side of the article to another. Thus for films, the pore extend from one side to the other.

If desired, the resulting latex particles can be treated to coagulate the polymeric particles. The particles can then be stored and redissolved, when desired, in a suitable solvent and applied as a coating to various substrates.

DETAILED DESCRIPTION OF THE INVENTION

The preparation of the polymeric particles of the invention depends on careful selection of the ingredients of the monomeric microemulsion from which the polymers are made. The monomeric microemulsions of the invention are prepared by mixing water, unsaturated organic monomers having fluoralkyl groups, fluorosurfactants, and optionally, co-solvents or inorganic salts. The amounts employed are 1–40 weight percent, preferably 5–15, fluorinated monomer; 1–40 weight percent, preferably 5–25, of the surfactant; with the remainder water.

Additional monomers can be present to make the polymers, but the monomers having perfluoroalkyl groups should comprises at least 30, preferably 50, weight percent of the total monomer content. Such additional monomers include epoxides, carboxyl acids, amines etc. which have unsaturated moieties.

Representative perfluoroalkyl-containing monomers include fluoroalkyl acrylates and fluoralkyl methacrylates of the formula

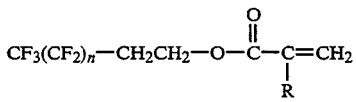

wherein n is a cardinal number of 3-13 and R is H or CH₃; fluoralkyl aryl urethanes, for example

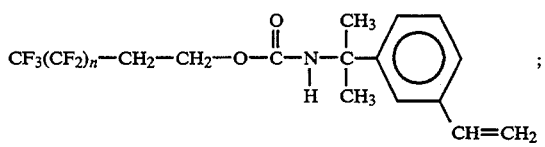

fluoralkyl allyl urethanes, for example

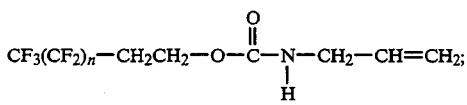

fluoralkyl maleic acid esters, for example

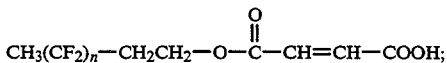

fluoralkyl urethane acrylates; fluoroalkyl acrylamides; fluoralkyl sulfonamide acrylates and the like. Preferably the fluorinated alkyl moieties will have 6–16 carbon atoms and most preferably 6–12 carbon atoms.

The fluorinated surfactants used have the general formula $R_f R\ Y\ X,$ where $R_f$ is a perfluoralkyl group or a perfluoralkylether group with carbon number from 1 to 15 and preferably from 6 to 9 and R is for example an alkylene group or an alkylene thioether (—CH₂—S—CH₂—) linkage with carbon number from 0 to 4. For fluorinated anionic surfactants, Y is for example a carboxylate group (COO—), sulfonic group (SO₃—), or sulfate group (SO₄—) and X is an alkaline metal ion or ammonium ion. For fluorinated nonionic surfactants, Y is for example an oxyethylene (OCH₂CH₂)ₘ linkage where m is an integer from 1 to 15 and preferably from 3 to 9 and X is a hydroxyl group. For fluorinated cationic surfactants, YX is for example a quarternary ammonium salt.

To make the polymerized microemulsions in a single batch process using the microemulsion described above, the temperature of the monomeric microemulsion is adjusted to between 5° to 100° C., preferably 5°–80° C., and free radical producing polymerization initiator added. Preferred initiators include persulfates, azo initiators, for example 2,2- azobis (2-amidopropane) dihydrochloride; peroxides, or photo initiators such as ultraviolet initiators and gamma ray initiators. Amounts of initiators present can range from 0.01 to 10 percent by weight based on monomer content. Cosolvents such as an alcohol, amines or other amphophilic molecules, or salt can be employed if desired to facilitate formation of the microemulsion.

Introduction of the initiator causes polymerization of the monomer to begin and the reaction proceeds. The resulting polymer particle latex has an average particle size of between 0.01 and 0.5 micrometer and a polymer average molecular weight of over 10,000, preferably over 20,000 or 50,000. The unusually small particle size provides a polymer system with a number of advantages over systems containing larger particles. The system is a colloidal dispersion and is usually clear rather than turbid. The small particle size aids in producing coatings of uniform thickness and maintains good gas permeability of porous substrates. The highly fluorinated nature of the pendant groups in the polymer chain aids in increasing the hydrophobicity and oleophobicity of substrates to which the polymer is applied.

The polymer so produced can be applied directly from the colloidal dispersion by immersing the substrate material into the dispersion, or by painting the substrate with the dispersion, or by spraying the dispersion onto the substrate. Suitable substrates include fabric materials with interstices, such as in knit fabrics; or woven or nonwoven materials, scrims, paper; or porous polymeric membranes of any form including sheets or tubes.

In addition it is possible to apply the monomeric microemulsion to the substrate and then cause the microemulsion to polymerize by photoinitiation.

Once the coating is applied to the substrate, any water, surfactant or initiator remaining can be drawn off by any convenient means, such as heating, steam stripping, vacuum evaporation or the like.

The resulting product is a coated substrate with the coating present as a surface layer if the substrate is non-porous. For porous substrates, which include porous polymers, and especially microporous polymeric membranes, the coating is ordinarily present as a coating on the internal structure of the substrate that makes up the pores. A particularly preferred substrate is a microporous polytetrafluoroethylene made by stretching polytetrafluorethylene tape or film as described in Gore U.S. Pat. No. 3,953,566. In this procedure the structure comprises an interconnected network of nodes and fibrils interconnecting the nodes, the nodes and fibrils comprising the internal structure that defines the pores.

The resulting coated articles provide gas permeable articles of enhanced hydrophobic and oleophobic properties. This makes them useful as gas filters, vent filters and as insulation for electrical wiring. In addition, thin, flexible porous films and membranes are useful in garment constructions where oil and water repellancy is desired.

TEST PROCEDURES

Particle Size Determination

Quasielastic light scattering was used to determine particle size. Microemulsion samples obtained as described in the examples were diluted with water to 100 times the original volume to eliminate interparticle interactions. Quasielastic light scattering cumulant functions were measured at 25° C. with a Brookhaven Model 9000AT goniometer and correlator at a scattering angle of 90°. Correlation functions were fit to a two term cumulant expression to determine the apparent diffusion coefficient, which was assumed to correspond to the reported particle size via the Stokes-Einstein relation. The solvent viscosity was assumed to be that of water.

Molecular Weight

Molecular weight was determined after precipitating and washing the polymer with acetone. The washed polymer was dissolved in Fluorinert ® FL-75 at 50° C.

Molecular weight and polymer concentration were determined at room temperature using a Viscotek Model 600 RALLS and differential refractometer operating at a wavelength of 0.67 micrometer. The Viscotek Model 600 RALLS instrument records the light scattered intensity at a scattering angle of 90°, and this value is related to polymer molecular weight using the principles of classical light scattering.

Air Permeability—Gurley Number Test

Gurley numbers were obtained as follows:

The resistance of samples of air flow was measured by a Gurley densometer (ASTM D726-58)manufactured by W. & L. E. Gurley & Sons. The results are reported in terms of Gurley Number which is the time in seconds for 100 cubic centimeters of air to pass through 1 square inch of a test sample at a pressure drop of 4.88 inches of water.

Water Repellency: Spray Test

The Spray Test was carried out by AATCC Test Method 22-1985. The higher the number the more water repellant.

Oil and Fluid Repellency Test

In these test, oil rating was carried out by AATCC Test Method 118-1983. The higher the number, the better the oil repellency.

EXAMPLES

Example 1

In a 100 milliliter glass reactor, 10 gram of fluoracrylate, namely,

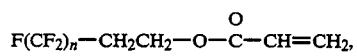

(from Du Pont, trade name Zonyl TA-N), 15 gram of ammonium perfluorooctanoate, and 70 gram of distilled water were charged and heated to 70° C. with stirring. A clear microemulsion with a light green color formed. Then, 0.1 gram of potassium persulfate in 5 gram of distilled water was charged into the reactor to initiate polymerization. Polymerization proceeded for about one hour at 70° C. At that time the mixture was cooled to room temperature. A clear latex was produced which was stable for at least 24 hours at room temperature. The average particle size of the latex was determined to be about 0.03 micrometer by quasielastic light scattering. The weight average molecular weight of the polymer produced was determined to be above 1,000,000 by classical light scattering techniques.

Example 2

In a 100 milliliter glass reactor, 10 gram of fluoromethacrylate (from Du Pont, trade name Zonyl TM), 20 gram of ammonium perfluorooctanoate, and 65 gram of distilled water were charged and heated to 75° C. with stirring. A clear microemulsion with a light green color formed. Then, 0.1 gram of ammonium persulfate in 5 gram of distilled water was charged into the reactor to initiate polymerization. Polymerization proceeded for about one hour at 75° C. at which time the mixture was allowed to cool to room temperature. A clear latex was produced which was stable for at least 24 hours at room temperature. The average particle size of the latex was determined to be about 0.03 micrometer by quasielastic light scattering. The weight average molecular weight was determined to be over 1,000,000 by classical light scattering techniques.

Example 3

In a 100 milliliter glass reactor, 5 gram of fluoracrylate (from Du Pont, trade name Zonyl TA-N), 9 gram of ammonium perfluorononanoate, and 80 gram of distilled water were charged and heated to 80° C. with stirring. A clear microemulsion with a light green color formed. Then, 0.06 gram of a cationic initiator (from Wako, trade name V-50 and believed to be 2,2-azobis (2-amidopropane) dihydrochloride) in 6 gram of distilled water was charged into the reactor to initiate polymerization. Polymerization proceeded for about one hour at 80° C. A clear latex was produced which was stable for at least 24 hours at room temperature.

Example 4

In a 100 milliliter glass reactor, 10 gram of Zonyl TA-N fluoroacrylate from Du Pont, 70 gram of a fluorinated anionic surfactant solution (Zonyl FSA, containing 25% solid and 37.5% isopropyl alcohol, from Du Pont), and 15 gram of distilled water were charged and heated to 70° C. with stirring. The surfactant of Zonyl FSA has a general structure of $R_fCH_2CH_2SCH_2CH_2COO-$ lithium salt, where $R_f$ is a perfluoroalkyl group with carbon number ranges from 6 to 12. A clear microemulsion with a light yellow color formed. Then, 0.1 gram of potassium persulfate in 5 gram of distilled water was charged into the reactor to initiate polymerization. Polymerization proceeded for about four hours at 70° C. At that time, the mixture was allowed to cool to room temperature. A clear latex was produced.

Example 5

In a 100 milliliter glass reactor, 10 gram of fluoracrylate (from Du Pont, trade name Zonyl TA-N), 10.5 gram of a fluorinated nonionic surfactant (from Du Pont, trade name Zonyl FSN-100 which is $CF_3(CF_2)_n CH_2CH_2(OCH_2CH_2)_m-OH$), and 75 gram of distilled water were charged and heated to 75° C. with stirring. A clear microemulsion with a light green color formed. Then, 0.15 gram of a cationic initiator (from Wako, trade name V-50) in 5 gram of distilled water was charged into the reactor to initiate polymerization. Polymerization proceeded for about two hours at 75° C. At that time the mixture was cooled to room temperature. A clear light yellow latex was produced which was stable for at least 24 hours at room temperature.

Example 6

In a 100 milliliter glass reactor, 9 gram of fluoroacrylate (from Du Pont, trade name Zonyl TA-N), 1 gram of butyl acrylate (from Aldrich), 15 gram of ammonium perfluorooctanoate, and 70 gram of distilled water were charged and heated to 70° C. with stirring. A clear microemulsion with a light green color formed. Then, 0.15 gram of a cationic initiator (from Wako, trade name V-50) in 5 gram of distilled water was charged into the reactor to initiate polymerization. Polymerization proceeded for about one hours at 70° C. At that time the mixture was cooled to room temperature. A translucent latex was produced which was stable for at least 24 hours at room temperature.

Example 7

In a 100 milliliter glass reactor, 9 gram of fluoracrylate (from Du Pont, trade name Zonyl TA-N), 1 gram of styrene (from Aldrich), 15 gram of ammonium perfluorooctanoate, and 70 gram of distilled water were charged and heated to 70° C. with stirring. A clear microemulsion with a light green color formed. The, 0.3 gram of a cationic initiator (from Wako, trade name V-50) in 5 gram of distilled water was charged into the reactor to initiate polymerization. Polymerization proceeded for about one hour at 70° C. at which time the mixture was cooled to room temperature. A translucent latex was produced and was stable for at least 24 hours at room temperature.

Example 8

In a 100 milliliter glass reactor, 9 gram of fluoracrylate (from Du Pont, trade name Zonyl TA-N), 1 gram of phenyl urethane ethyl acrylate (from reaction of phenyl isocyanate with 2-hydroxyethyl acrylate), 15 gram of ammonium perfluorooctanoate, and 70 gram of distilled water were charged and heated to 70° C. with stirring. A clear microemulsion with a light green color formed. Then, 0.3 gram of ammonium persulfate in 5 gram of distilled water was charged into the reactor to initiate polymerization. Polymerization proceeded for about two hours at 70° C. at which time the mixture was cooled to room temperature. A translucent latex was produced which was stable for at least 24 hours at room temperature.

Example 9

A mixture of fluorinated monomer, hydrogenated monomer, fluorinated surfactant, and hydrogenated surfactant was employed.

In a 100 milliliter glass reactor, 4 gram of fluoracrylate (from Du Pont, trade name Zonyl TA-N), 2 gram of styrene (from Aldrich Chemical), 3 gram of ammonium perfluorooctanoate and 7 gram of sodium dodecylsulfate (from aldrich also) and 80 gram of distilled water were charged and heated to 70° C. with stirring. A microemulsion formed. Then, 0.07 gram of a cationic initiator (from Wako, trade name V-50) in 5 gram of distilled water was charged into the reactor to initiate polymerization. Polymerization proceeded for about two hours at 70° C. A translucent latex was produced and on cooling was stable for at least 24 hours at room temperature.

Example 10

(A) A mixture of fluorinated monomer and a hydrogenated crosslinking agent:

In a one liter glass reactor, 58 gram of fluoromethacrylate (from Du Pont, trade name Zonyl TM), 2 gram of allylglycidyl ether (from Aldrich), 120 gram of ammonium perfluorooctanoate and 480 gram of distilled water were charged and heated to 75° C. with stirring. A clear microemulsion formed. Then, 0.3 gram of a cationic initiator (from Wako, trade name V-50) in 10 gram of distilled water was charged into the reactor to initiate polymerization. Polymerization proceeded for about two hours at 75° C. A transparent latex was produced and on cooling was stable for at least 24 hours at room temperature.

(B) A mixture of fluorinated monomer and a fluorinated crosslinking agent:

In another one liter glass reactor, 57 gram of fluormethacrylate (from Du Pont, trade name Zonyl TM), 3 gram of perfluoralkyl maleic acid ester (from a reaction product of equal molar amount of perfluoralkyl ethyl alcohol, trade name Zonyl BA-N from Du Pont, and maleic anhydride at 110° C. for two hours), 120 gram of ammonium perfluorooactanoate and 480 gram of distilled water were charged and heated to 75° C. with stirring. A clear microemulsion formed. Then, 0.3 gram of a cationic initiator (from Wako, trade name V-50) in 10 gram of distilled water was charged into the reactor to initiate polymerization. Polymerization proceeded for about two hours at 75° C. A transparent latex was produced and on cooling was stable for at least 24 hours at room temperature.

Example 11

Coating substrates:

The latex produced in Example 1 was used to coat a piece of nylon fabric, a piece of polyester fabric, and a piece of expanded microporous polytetrafluorethylene (PTFE) membrane provided by W. L. Gore & Associates, Inc. The coating procedure was to dip the substrates into the latex and let excess fluid drip off. Then the coated substrates were placed in an oven at 225° C. For 3 minutes. During the drying process, water and the fluorinated surfactant were removed from the substrates and the fluorinated polymer melted and flowed on the surface of the substrates. When cooled to room temperature, the substrates were subject to tests for water repellency, oil repellency and air permeability. For the nylon and polyester coated fabrics, both treated samples had water spray ratings of 100 and oil ratings of 7, while untreated samples had water spray ratings of 0 and oil ratings of 0. For the expanded PTFE membrane, the untreated sample had an oil rating of 1 and a Gurley number of 11 seconds, while the treated sample had an oil rating of 8 and Gurley number of 14 seconds.

Example 12

Coating Substrates and Crosslinking the Surface Coating:

Equal amounts of the latex produced from Example 10(A) and (B) were mixed and used to coat the substrates as described in Example 11. The coating procedure was the same as in Example 11. The treated samples were evaluated and the results are given below.

For nylon and polyester fabrics, both treated samples had water spray ratings of 100 and oil ratings of 7, while untreated samples had water spray ratings of 0 and oil rating of 0. For the expanded PTFE membrane, the untreated sample had an oil rating of 1 and a Gurley number of 11 seconds, while the treated sample had an oil rating of 8 and Gurley number of 14 seconds.

Example 13

Coating Substrates:

The latex produced in Example 2 as coagulated by adding an equal volume of acetone. The polymer precipitated and was washed several times with acetone to remove surfactant from the polymer. The polymer then was air dried at room temperature for 48 hours. It was a fine white powder. The powder was found to dissolve in fluorinated solvents such as Fluorinert® obtained from 3M Company. The solubility of the fluormethacrylate polymer is at least 1 weight % in either Fluorinert FC-77, FC-75, or FC-40 at 40° C.

The 1 weight % polymer in FC-75 solution as used to coat the substrates used in Example 11. The coating procedure was the same as in Example 11 except the oven temperature as 150° C. for 1 minute. The treated samples were evaluated and the results are given below.

For the nylon and polyester fabrics, both treated samples had water spray ratings of 100 and oil ratings of 7, while untreated samples had water spray ratings of 0 and oil ratings of 0. For the expanded PTFE membrane, the untreated sample had an oil rating of 1 and a Gurley number of 11 seconds, while the treated sample had an oil rating of 7 and a Gurley number of 13 seconds.

We claim:

1. A coated article comprising a substrate containing a coating of an aqueous latex in which particles of organic polymer having recurring pendant perfluorinated organic side chains are present and in which the particles have an average size of between 0.01 and 0.5 micrometers.

2. The coated article of claim 1 in which the organic polymer comprises a polymer selected from the class consisting of polymers derived from fluoralkyl acrylates, fluoralkyl methacrylates, fluoralkyl aryl urethanes, fluoralkyl allyl urethanes, fluoralkyl maleic acid esters, fluoralkyl urethane acrylates, fluoralkyl acrylamides, and fluoralkyl sulfonamide acrylates.

3. The coated article of claim 1 in which the organic polymer comprises a polymer containing recurring units derived from

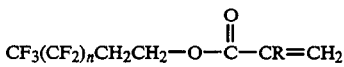

wherein R is hydrogen or methyl and n is an integer between 4 and 12.

4. A coated article comprising a porous substrate in which at least a portion of the interior of the substrate is coated with an aqueous latex in which particles of organic polymer having recurring pendant perfluorinated organic side chains are present and in which the particles have an average size of between 0.01 and 0.5 micrometers.

5. The coated article of claim 4 in which the organic polymer comprises a polymer selected from the class consisting of polymers derived from fluoralkyl acrylates, fluoralkyl methacrylates, fluoralkyl aryl urethanes, fluoralkyl allyl urethanes, fluoralkyl maleic acid esters, fluoralkyl urethane acrylates, fluoralkyl acrylamides, and fluoralkyl sulfonamide acrylates.

6. The coated article of claim 5 in which the organic polymer comprises a polymer containing recurring units derived from

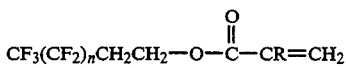

wherein R is hydrogen or methyl and n is an integer between 4 and 12.

7. A coated article comprising a microporous film of polytetrafluoroethylene in which the microporous structure is formed by nodes interconnected with fibrils, in which at least a portion of the nodes and fibrils are coated with an aqueous latex in which particles of organic polymer having recurring pendant perfluorinated organic side chains are present and in which the particles have an average size of between 0.01 and 0.5 micrometers.

8. The coated article of claim 7 in which the organic polymer comprises a polymer selected from the class consisting of polymers derived from fluoralkyl acrylates, fluoroalkyl methacrylates, fluoralkyl aryl urethanes, fluoralkyl allyl urethanes, fluoralkyl maleic acid esters, fluoralkyl urethane acrylates, fluoralkyl acrylamides, and fluoralkyl sulfonamide acrylates.

9. The coated article of claim 8 in which the organic polymer comprises a polymer containing recurring units derived from

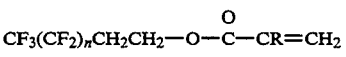

wherein R is hydrogen or methyl and n is an integer between 3 and 13.

* * * * *